Dec. 8, 1931.   F. GERTH   1,835,387
ELECTRIC WAVE GENERATOR
Filed Nov. 23, 1926
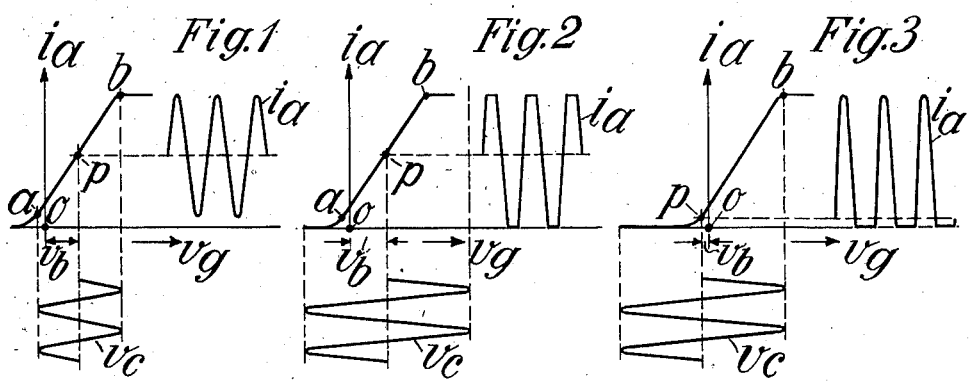
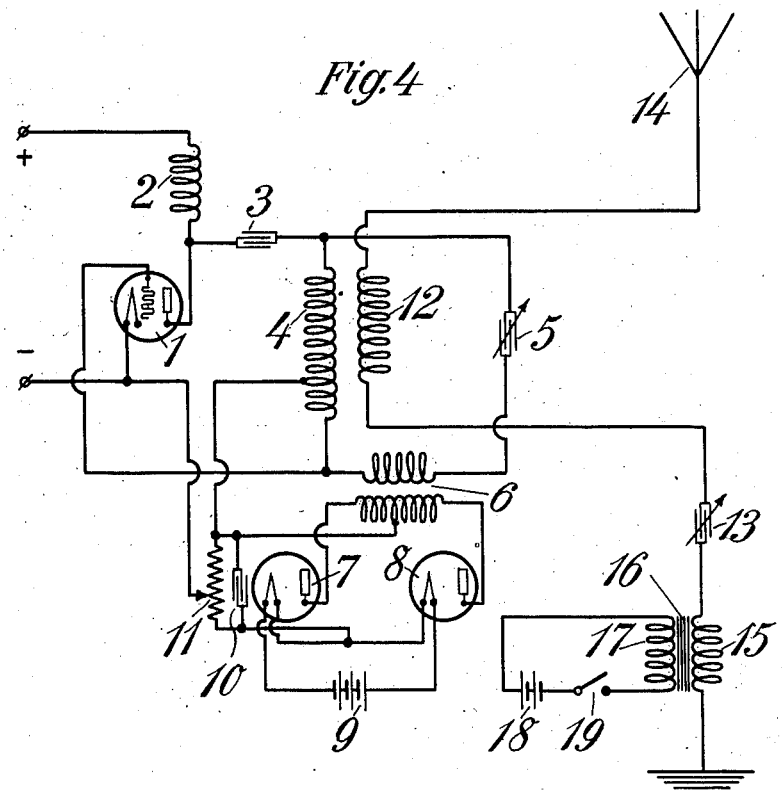
Inventor
Félix Gerth
per
Attorney Patented Dec. 8, 1931

1,835,387

UNITED STATES PATENT OFFICE

FELIX GERTH, OF BERLIN-TEMPELHOF, GERMANY, ASSIGNOR TO C. LORENZ AKTIEN-GESELLSCHAFT, OF BERLIN-TEMPELHOF, GERMANY

ELECTRIC WAVE GENERATOR

Application filed November 23, 1926, Serial No. 150,315, and in Germany November 24, 1925.

This invention relates to arrangements for the generation of high frequency electric oscillations by means of vacuum tubes and is more particularly directed to improvements in operating conditions.

An object of this invention is to provide means for introducing a grid bias during oscillating periods and withdrawing it at the cessation of these oscillations.

Another object is to provide a rectifying means by which a part of the energy from the oscillating circuit is converted into direct current and serves as a source of grid bias.

A further object of this invention is to secure an automatic system of controlling the grid bias in such a way that the oscillating system operates at a maximum efficiency and that excessive loading of the oscillating tube during cessation of oscillations is prevented.

The invention is more fully understood by reference to the following description, in connection with the accompanying drawings of which Figure 1 is a diagram showing the essential features of oscillation of the first category and of which Figures 2 and 3 are diagrams showing the essential features of oscillations of the first and second categories respectively, whereas Figure 4 shows a diagram of connections for carrying out one form of the invention.

As is well known, when using vacuum tubes in a like manner as when using arc-generators, the oscillations which can be produced may be divided into two categories. When generating the first category of oscillations the working point on the tube characteristic and the maximum values of the controlling voltage applied to the grid electrodes of a normal three-electrode vacuum tube are so chosen, that the anode current is varying between its zero and its saturation value, preferably along the steep portion of the characteristic curve representing anode current as a function of the grid voltage. Thus, using a purely sinusoidal control voltage at the grid electrode the anode current oscillations are also obtained of a pure sine wave shape. These oscillations may be called of the first category. With these oscillations the power developed divides in two equal parts viz., into losses produced within the oscillating tube and the external load oscillating energy. The highest efficiency obtainable with this category of oscillations is therefore 50%. This efficiency may be improved, as is well known, by generating oscillations of the so-called second category in contrast to the before-mentioned oscillations of the first category. The oscillations of second category are obtained by increasing the maximum values of the controlling voltage, so that it surpasses the value at which the anode current and the anode oscillations assume a trapezoidal or nearly rectangular shape.

There exist however certain drawbacks with these methods in that the anode average continuous current retains its value when the oscillations are stopped, e. g. during the keying intervals or during the breakdown of the grid voltage. Hence the oscillating energy generated during the oscillating period is transformed into continuous current energy, so that the heat losses within the tube and its load would be doubled and tubes, particularly such of greater power would in most cases be destroyed. This inconvenience as is well known may be obviated with generation of oscillations of the second category, by choosing the working point of the tube characteristic not in the middle of the sloping part of the latter, as is necessary with oscillations of the first category, but by shifting this point to the lower part of the characteristic curve even to a negative grid bias. By this means the average continuous current flowing through the tube after the oscillations have been stopped suddenly, has only a small value and the danger of the tube being damaged is avoided.

My invention presents means to overcome these disadvantages and may be carried out in the case of oscillations of the first category. It also obviates a shifting of the working point in the case of oscillations of the second category, which latter is a disadvantage in so far as the starting of the oscillations is the more difficult the lower the working point on the tube characteristic. According to my invention the desired grid bias voltage is influenced or controlled in accordance with the oscillations of the tube itself, e. g. it is applied or withdrawn automatically by the starting and stopping of the oscillations. Another means consists in that the grid bias necessary for the working of the tube may be supplied by a fraction of the generated oscillating energy, and the intermediary of a suitable rectifying arrangement, so that when the oscillations are stopped the grid bias vanishes immediately, and the average continuous current of the tube automatically assumes an insignificant value.

Referring to Fig. 1 of the drawings a sinusoidal controlling grid voltage $v_c$ is varying within the rectilinear portion $a$—$b$ of the tube characteristic representing anode current $i_a$ as a function of grid voltage $v_g$. The working $p$ is adjusted by means of the grid bias voltage $v_b$. The purely sinusoidal first category oscillations in the anode circuit are represented by the curve $i_a$. Oscillations of the second category are obtained by increasing the controlling voltage $v_c$ beyond the value for the anode current limits $a$—$b$, i. e. by a more intense control of the tube. This is shown in Figure 2; Figure 3 shows in a like manner oscillations with the working point $p$ shifted to the lower end of the characteristic curve, and it is seen that the D. C. zero component has an insignificant value. The reference characters in Figures 2 and 3 correspond to like elements of Figure 1.

According to Fig. 4, 1 is an oscillating tube, 2 is a high frequency choke-coil for preventing the high frequency oscillations from entering the anode current source, 3 is a blocking condenser for preventing the application of the anode voltage to the grid of the tube, 4 means the self-inductance of the oscillating circuit, 5 the capacity of the same and 6 is a transformer for supplying the grid bias necessary for the working of the tube. The secondary current of this transformer is rectified by means of an arrangement consisting of two rectifying tubes 7 and 8 connected in a manner well-known in the art as seen in the drawings. Item 9 is a battery for heating the filaments of the rectifying tubes, 10 is a smoothing condenser and 11 a potentiometer for adjusting to a suitable value the grid bias voltage. This may also be altered by changing the transformation ratio of the transformer 6. The coil 4 of the oscillating circuit is coupled to an antenna circuit consisting of antenna 14, coupling coil 12 and tuning condenser 13. With the oscillations starting, the tube is building up to the working point $p$ provided the conditions exist for securing the correct grid voltage. If the oscillations are stopped by some cause or other, the grid bias vanishes automatically, and the zero current of the tube decreases to an insignificant value as is seen from Figures 1 and 2. There is no more risk of the tube being damaged.

My invention as described is particularly adapted for keying the oscillation energy in accordance with signals to be transmitted. For, when keying a transmitter, oscillations are suppressed during the keying intervals—except in the case where keying is carried on by detuning, a method which has been practically discontinued—and therefore the question arises here too, about the protection of the tubes against an overload. For this purpose several means have already been proposed. When making use of the arrangement according to my invention keying may be carried out in an easy manner in the anode circuit or any other circuit carrying the oscillating currents e. g. referring to the diagram in Fig. 4 by means of an iron-cored choking device 16, the high-frequency winding 15 of which is interposed in the antenna circuit, and which has a controlling winding 17 supplied by the current of a direct current source 18 in connection with a signalling key 19. The high-frequency resistance of the choke is so high, that with the iron core unsaturated (key open) the oscillations in the antenna circuit are almost suppressed, while with the key closed and the iron core magnetically saturated the choke coil acts like a short-circuit for the high-frequency oscillations.

What I claim and wish be secured by Letters Patent of the United States is as follows:

1. An arrangement for generation of high frequency oscillations comprising a thermionic valve with anode, cathode and control electrode, an oscillatory output circuit associated with said valve, a controlling circuit associated with said control electrode, said circuits being in operative relationship to produce sustained electrical oscillations in said output circuit, a rectifier system, means for supplying high frequency energy to said rectifier system from said oscillatory circuit, and means for using the potential derived from said rectifier to secure a voltage bias on said control electrode.

2. In a vacuum tube oscillator comprising in combination a three-electrode vacuum tube having an anode, grid and cathode, intercoupled input and output circuits for said vacuum tube for producing sustained electric output oscillations and means for utilizing part of the energy of said oscillations for supplying a constant grid bias for said tube.

3. An arrangement for generation of high frequency oscillations comprising a thermionic valve with anode, cathode and control electrode, an oscillating output circuit associated with said valve, a controlling input circuit, means for connecting said circuits in operative relation with each other for producing sustained electrical oscillations, a rectifier system, a transformer for supplying high frequency energy from said output circuit to said rectifier system, a potential divider connected to the output of said rectifier system and a tap on said potential divider and from said potential divider to the control electrode connections for supplying a biasing operating voltage to said control electrode.

4. An arrangement for generation of high frequency oscillations comprising a thermionic valve with anode, cathode and control electrode, an oscillating circuit associated with said valve, a controlling input circuit, means for electrically connecting said circuits in operative relation with each other for producing sustained electrical oscillations, rectifier means electrically associated with said oscillatory circuit for withdrawing energy therefrom, and means for utilizing said energy derived from said oscillatory circuit for applying a constant voltage bias on said control electrode.

In testimony whereof I have affixed my signature.

Dr. FELIX GERTH.